United States Patent
Singh et al.

(10) Patent No.: US 6,287,724 B2
(45) Date of Patent: Sep. 11, 2001

(54) NICKEL METAL HYDRIDE CELLS DESIGNED FOR HIGH RATE/LOW TEMPERATURE PERFORMANCE

(75) Inventors: Deepika B. Singh; Lianying Zhang; Michael R. Klein; Vince Puglisi; Thomas R. DeMoully, all of Gainesville, FL (US); Jai Prakash, Naperville, IL (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 09/118,660

(22) Filed: Jul. 17, 1998

Related U.S. Application Data (60) Provisional application No. 60/064,682, filed on Nov. 3, 1997, and provisional application No. 60/064,681, filed on Nov. 3, 1997.

(51) Int. Cl.[7] .................................................. H01M 4/58
(52) U.S. Cl. .................. 429/218.2; 429/223; 429/224
(58) Field of Search ............................... 429/218.2, 223, 429/224

(56) References Cited

FOREIGN PATENT DOCUMENTS

| | | |
|---|---|---|
| 0 284 333 A2 | 9/1988 | (EP) . |
| 0 577 991 A2 | 1/1994 | (EP) . |
| 0 586 718 A1 | 3/1994 | (EP) . |
| 0 696 825 A1 | 2/1996 | (EP) . |
| 4-065067 | 3/1992 | (JP) . |
| 5-275082 | 10/1993 | (JP) . |

*Primary Examiner*—Laura Weiner
(74) *Attorney, Agent, or Firm*—Linda Gebauer; Robert W. Welsh (57) ABSTRACT

A metal hydride rechargeable cell is provided that discharges during a test discharge at a rate of 8 C to 18 C and a cell temperature of 0° C. where the voltage remains above 0.2 volts during the half of the discharge curve. The cell comprises a negative electrode of hydrogen storage alloy material having a particle size volume distribution whose d(50) value does not exceed $2(2D_h t)^{1/2}$, where $D_h$ is the hydrogen diffusion coefficient for the alloy at 0° C. and t is a time period from about 200 to about 450 seconds. A method of manufacturing the cell of the present invention involves an activation protocol comprising at least one formation cycle, a heat treating step, and a cycling step. This method avoids unnecessary processing of the metal alloy material prior to incorporation into the negative electrode.

8 Claims, 6 Drawing Sheets

NICKEL METAL HYDRIDE CELLS DESIGNED FOR HIGH RATE/LOW TEMPERATURE PERFORMANCE

CROSS REFERENCE TO RELATED APPLICATIONS

This application claims priority from provisional application Ser. No. 60/064,682 filed on Nov. 3, 1997, the disclosure of which is incorporated herein by reference in its entirety and from provisional application Ser. No. 60/064,681 filed on Nov. 3, 1997, the disclosure of which is incorporated herein by reference in its entirety.

FIELD OF THE INVENTION

This invention relates generally to metal hydride cells and more particularly, to nickel metal hydride cells for use in high rate applications in low temperature environments.

BACKGROUND OF THE INVENTION

Nickel cadmium cells have long been the standard for high discharge applications such as power tools. However, increasing emphasis is being placed on nickel metal hydride electrochemical cells as replacements for nickel cadmium cells. Nickel metal hydride cells avoid environmental concerns relating to cadmium and have improved energy density. Nickel metal hydride cells are mainly used with low rate discharge devices such as cellular phones and portable computers due to problems in nickel metal hydride power performance when used with high rate discharge devices.

The shortfalls in power performance characteristics generally occur at high discharge rates and at low temperatures during initial use of existing nickel metal hydride cells. When discharged at a high pulsed rate, for example 18 C (a current in amperes which is 18 times the value of the rated capacity of the cell) as in most power tools, nickel metal hydride batteries known in the art exhibit a voltage polarization during the initial operational discharge. At low temperatures, for example, at or below 0° C., this voltage polarization is even more pronounced and severely limits the power capabilities of the battery. Cycling of the cell or battery that occurs during subsequent charging and discharging may reduce the effects of this polarization, but obviously has no effect on the disabling voltage polarization encountered initially. Consequently, there is a need for enhancing the performance of metal hydride electrochemical cells during the initial operational discharge of the cells.

BRIEF SUMMARY OF THE INVENTION

It is one object of the present invention to provide a metal hydride cell designed for the demands of power tools, household appliances, electric vehicles and other battery-powered devices.

It is a further object of the present invention to provide a metal hydride cell which provides required power at high discharge rates and at low temperatures during the initial operational discharge.

It is a further object of the present invention to provide a rechargeable power source for high drain applications at low temperatures with no added cadmium.

It is a further object of the present invention to provide a method of manufacturing a metal hydride cell which provides required power at high discharge rates and low temperatures during the initial operational discharge, where the method avoids unnecessary processing of the hydrogen storage metal alloy material prior to incorporating the material into the negative electrode.

To achieve the foregoing and other objects and advantages and in accordance with a purpose of the present invention, as embodied and broadly described herein, a metal hydride cell is provided which discharges during a test discharge at a cell temperature of 0° C. and a discharge rate of 8 C to 18 C with the voltage remaining above 0.2 volts during the first half of the discharge curve. The metal hydride cell is comprised of a positive electrode preferably utilizing nickel hydroxide as the active material, a negative electrode utilizing a hydrogen storage metal alloy material as the active material, and an alkaline electrolyte. These components are arranged in a sealed container in a manner effective to provide electrochemical energy.

In another aspect of the within invention, the negative electrode of the cell of the present invention comprises a metal alloy with a particle size volume distribution whose d(50) value prior to the initial operational discharge of the cell does not exceed the required maximum particle size. The required maximum particle size=$2(2D_h t)^{1/2}$, where $D_h$ is the hydrogen diffusion coefficient for the alloy at 0° C. and t is a time from 200 to 450 seconds, corresponding to a discharge rate from 18 C to 8 C.

In yet another aspect of the within invention, the metal hydride cell of the present invention is prepared by subjecting the cell to at least one formation cycle, heat treating said cell and cycling said cell, where said steps are performed prior to the initial operational discharge of the cell. In a preferred embodiment, this method comprises a formation cycle at about a C/8 to a C/6 charge for approximately 11 to 16 hours followed by a discharge at 2 C to 0.9 volts. The heat treatment preferably comprises subjecting the cell to a temperature of 30° C. to 120° C. for approximately 20 to 24 hours followed by a hold period sufficient to enable the cell to return to room temperature. The cycling preferably comprises 1 to 10 charge/discharge cycles.

The cells of this invention provide a rechargeable power source for high drain applications at low temperatures and are substantially free of cadmium. The cells do not experience disabling voltage polarization during the initial operational discharge of the cell, and can be manufactured without processing the hydrogen storage metal alloy material prior to incorporating the material into the negative electrode.

DETAILED DESCRIPTION OF THE INVENTION

The subject invention provides metal hydride cells which are able to provide high power output even in cold temperatures during the initial operational discharge of the cell. The "initial operational discharge" of the cell, as used herein, is the first cell discharge initiated by the end user of a battery powered device, such as a power tool, connected to the cell to provide current to the device. A "test discharge" of the cell, as used herein, is any discharge prior to the initial operational discharge, such as cell discharges occurring during the manufacture and testing of the cell and the device. A cell according to the present invention does not experience disabling voltage polarization during a test discharge and will therefore avoid disabling voltage polarization during the initial operational discharge at the same cell temperature and discharge rate, since voltage polarization tends to diminish with increasing cycle number. For purposes of the present invention, "disabling voltage polarization" refers to a drop in cell voltage below 0.2 volts during the first half of a discharge curve. The cells of the subject invention are substantially free of cadmium, meaning that there is no added cadmium to any of the cell components. The total amount of cadmium present within the cell is therefore only the residual amount, if any, naturally present in the cell components. When the cell is disposed of, no amount of cadmium is added to the environment that is greater than the amount that was present before the cell was assembled.

The metal hydride cells of the present invention comprise an alkaline electrolyte, a positive electrode and a negative electrode according to the present invention, arranged in a sealed container in a manner effective to provide electrochemical energy. The cell container is preferably a cylindrical metallic can of steel, nickel or nickel plated steel. Alternatively, the cell configuration can be prismatic or button-shaped or other configurations as are known in the art. The container is hermetically sealed or equipped with a resealable safety valve, although the present invention can also be used with a semi-sealed or flooded cell. A cylindrical "jellyroll" construction is specifically exemplified herein, but should not be construed as limiting the teachings herein.

In such a typical cell, the electrodes are formed into sheets and sandwiched together in layers with a porous nylon separator or other suitable material located between the positive and negative electrodes to provide electrical isolation between the electrodes while allowing sufficient ionic diffusion between them. The electrode sheets and separator are spirally wound and placed within the can. The can has a positive terminal positioned on the sealed end of the can preferably formed from a positive electrode tab welded to the cover, and a negative terminal formed from contact between the negative electrode and the inner sides of the can. This contact can be a result of an interference fit, or due to spot welding or the like between the can and the negative electrode, or any combination thereof.

The cell of the present invention preferentially employs a nickel based material as the electrochemically active material for the positive electrode. Preferably, the active material is nickel hydroxide, but can also comprise silver or silver oxide, or manganese oxides. Various additives, including calcium, cobalt, cobalt oxide, barium, magnesium, zinc, strontium, manganese and combinations thereof may be incorporated into the active material. The preferred positive electrode is a sintered positive electrode. The electrode substrate is formed by sintering nickel powder onto a perforated metal substrate. The porous sintered nickel substrate is then impregnated with nickel nitrate. The nickel nitrate is then chemically converted to nickel hydroxide by exposing the impregnated substrate to an alkaline solution, preferably sodium hydroxide. Pasted nickel hydroxide electrodes can also be used to practice the within invention and are produced by depositing, drying and then pressing a nickel hydroxide paste into contact with an appropriate current collector substrate, such as foam, screen, felt, or expanded metal. A sintered positive electrode is specifically exemplified herein, but should not be construed as limiting the teachings herein.

The cell of the present invention employs a hydrogen storage metal alloy material as the electrochemically active material for the negative electrode. Typical alloys for the negative electrode include the so-called $AB_2$-type as disclosed, for instance, in U.S. Pat. No. 4,716,088 (Reichman, et al). These $AB_2$ alloy materials are based on $TiV_2$ and typically encompass the elements Ti, V, Cr, Zr, X and Y, where X and Y can be other elements of various selection. The invention is more preferably used in a cell containing a negative electrode having hydrogen storage alloy materials of the so-called $AB_5$-type, a common example of which is described by the formula $MmNi_aCo_bMn_cAl_d$, where Mm refers to a lanthanum-rich misch metal including various other rare earth metals, and wherein $2.5<a<5.0$, $0<b<2.5$, $0<c<0.5$ and $0<d<0.5$. The A component can also include other misch metals of various composition. Hydrogen storage alloys of this class are disclosed, for instance, in U.S. Pat. No. 4,216,274 (Bruning, et al) and U.S. Pat. No. 4,375,257 (Bruning, et al). Additional metallic constituent elements may be included in the particular $AB_5$-type alloy, or added as substitutes for the listed elements. Typically, this alloy is finished to a powder having a particle size of about −140 mesh with a d(50) of about 40 μm. $A_2B$ alloys such as disclosed in U.S. Pat. No. 4,431,561, and mixtures of alloys can also be used to practice the within invention.

The negative electrode may be of the pasted or compressed powdered type. Typically a paste is prepared having the alloy powder, a binder such as teflon or CMC or HPMC or the like, and solvent. Other additives such as nickel powders, carbon and graphites may be added to increase conductivity or facilitate some other desired performance attribute. This paste is coated onto a perforated nickel plated metal substrate, perforated nickel substrate, or a similar substrate material or imbedded into a foam metal structure or a screen. Preferably, the substrate is a nickel plated perforated steel.

An alternative is to fabricate a dry powder electrode by pressing or rolling the alloy powder onto a nickel or nickel plated steel substrate or the like to produce a compacted powder electrode. This dry powder electrode may be treated at elevated temperatures and special atmospheres to "sinter" the material to impart additional attributes.

The preferred separator material is a nylon 6/66 blend. Other suitable separator materials may include polypropylene, polyethylene, and surface grafted modifications thereof. The preferred electrolyte is a mixture of 35 weight % potassium hydroxide and 1.5 weight % lithium hydroxide solution, although other alkaline electrolytes may be employed to practice the within invention.

Figure 1:
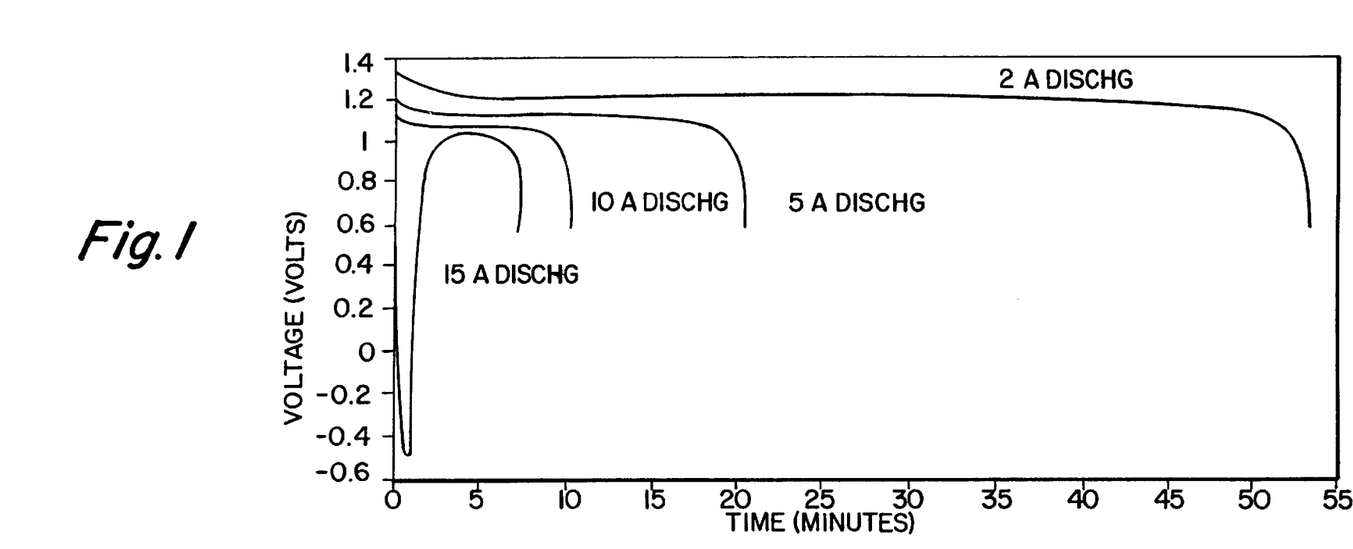
FIG. 1 is a graph of voltage versus time during discharge of a known nickel metal hydride cell at the indicated discharge rates and a cell temperature of 0° C.

Existing nickel metal hydride cells demonstrate disabling voltage polarization during the initial operational discharge at high discharge rates and low temperatures. "Disabling voltage polarization" refers to a drop in cell voltage below 0.2 volts during the first half of a discharge curve. Disabling voltage polarization at high discharge rates and low temperatures can be observed in the initial operational discharge of a drill, for example, where the drill bit slows and may cease to turn. FIG. 1 illustrates the discharge curves for existing nickel metal hydride cells during a test discharge at discharge rates of 2 amperes, 5 amperes, 10 amperes and 15 amperes (corresponding to a 1 C, 2.5 C, 5 C and 7.5 C discharge rate for a cell having a nominal capacity of 2 ampere-hours) and a cell temperature of 0° C. "A cell temperature of 0° C." as used herein means that the reported cell was stored in an ambient temperature of 0° C. for a period of at least three hours prior to the discharge. When the discharge rate reaches 15 amperes the cell voltage exhibits disabling voltage polarization.

Figure 2:
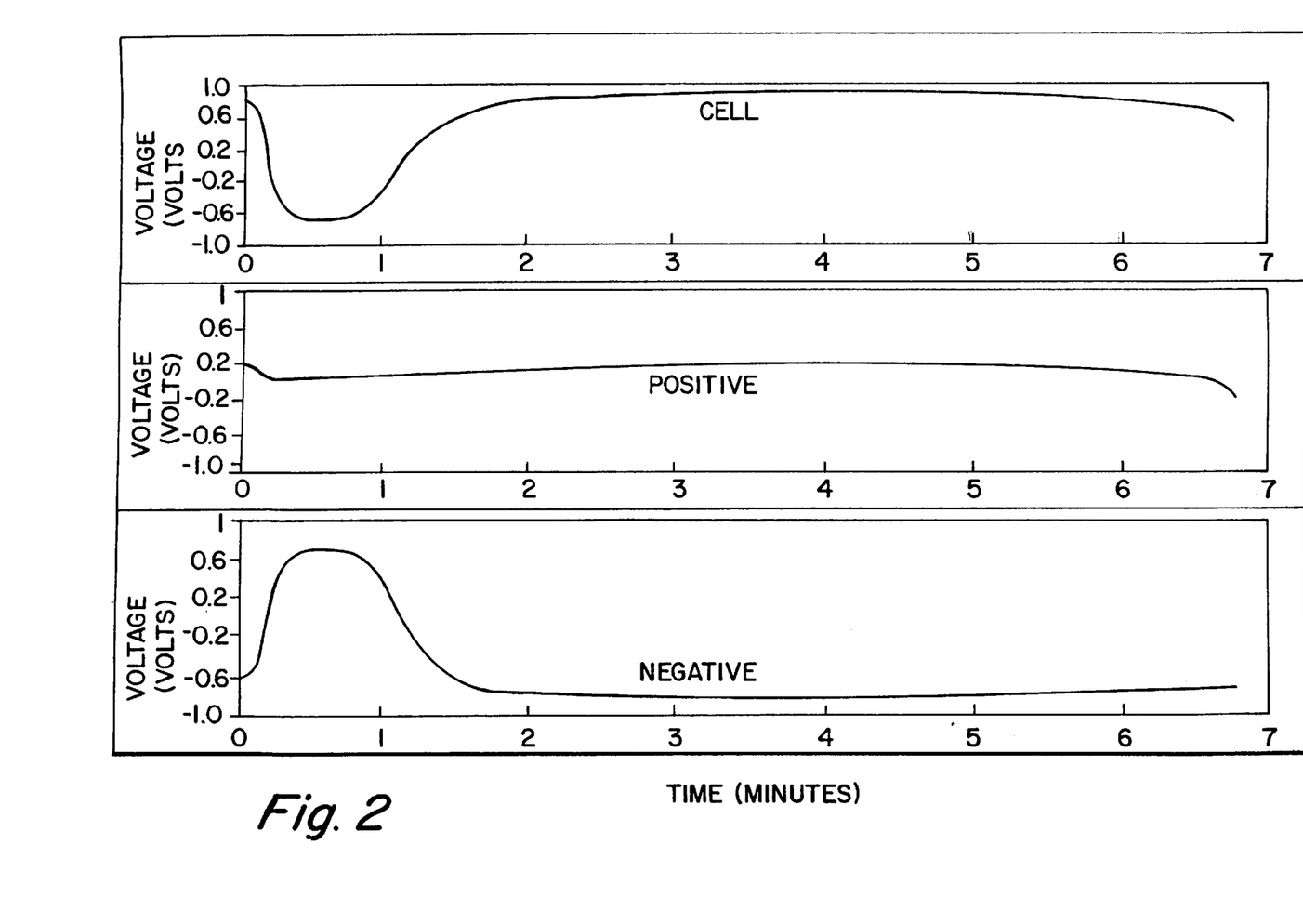
FIG. 2 is a graph of voltage versus time for each electrode of a known nickel metal hydride cell as well as the overall cell voltage for the cell.

In order to address the shortfalls in power performance of existing nickel metal hydride cells, investigations were carried out to isolate the causes for the disabling voltage polarization at high discharge rates and low temperatures. A sub C size nickel metal hydride cell of 2 ampere hours nominal capacity was fitted with a reference electrode. The hydrogen storage alloy material of the negative electrode had a nominal formula $MmNi_{3.6}Co_{0.7}Mn_{0.3}Al_{0.4}$. The lanthanum-rich misch metal was 33.34 wt. percent of the total alloy weight and had the following composition: lanthanum (50–55% by wt.), cerium (30–35% by wt.), neodymium (9–13% by wt.) and praseodymium (3–5% by wt.). The nickel substituted metal was 66.64 wt. percent of the total alloy weight and had the following composition: nickel (50.33% by wt.), cobalt (9.83% by wt.), manganese (3.93% by wt.) and aluminum (2.57% by wt.). This alloy is commercially available. One source is Treibacher Auermet. The metal hydride powder was nominally −140 mesh with a mean particle diameter, d(50), of 39 $\mu$m. It was determined from the separate discharge profiles for each electrode and the overall cell discharge profile (FIG. 2) that the polarization was caused by the negative electrode.

One aspect of the present invention is the discovery that the rate of hydrogen diffusion through the hydrogen storage metal alloy of the negative electrode is a limiting factor in eliminating disabling voltage polarization with metal hydride cells at high discharge rates and low temperatures. Solid state diffusion theory relates the maximum hydrogen diffusion path distance with the hydrogen diffusion coefficient, $D_h$, and time. For a constant temperature, the maximum diffusion path distance for a time, t (seconds), is:

$$\text{maximum diffusion path distance} = (2D_h t)^{1/2}$$

The time, t, is the time associated with a desired discharge rate. For a C-rate discharge, the associated time is 3600 seconds. For an 8 C discharge rate, the associated time is 3600/8=450 seconds. For an 18 C discharge rate, the associated time is 3600/18=200 seconds.

The hydrogen diffusion coefficient, $D_h$, is an intrinsic property of a given alloy and has a constant value at a given temperature. A preferred method to determine the hydrogen diffusion coefficient for an alloy is the potential step technique. For a single alloy particle, the discharge current is related to the hydrogen diffusion coefficient, $D_h$, when sufficient time has elapsed so that secondary effects subside. This is typically greater than about 400 sec. This relationship is as follows:

$$\ln(i) = \ln(-2FAD_h \Delta c/l) - D_h^2 t/4r^2$$

where F, A, $D_h$, l, and t denote the Faraday constant, area of the electrode, hydrogen diffusion coefficient, diffusion layer thickness, and time respectively, and $\Delta c$ represents the difference in the equilibrium hydrogen concentrations before and after the potential step load and r is the particle radius. The hydrogen diffusion coefficient, $D_h$, can be obtained from the slope of the ln(i) vs. time plot.

To determine the hydrogen diffusion coefficient, $D_h$, in accordance with the present invention, microelectrodes are fabricated with a single spherical particle of metal hydride forming alloy, where the typical diameter of the particle ranges from about 100 to 400 $\mu$m. The counter electrode is a gold film, and a Hg/HgO electrode is used as the reference. The working metal hydride forming alloy electrode particle is immersed in 7N potassium hydroxide electrolyte and charged with hydrogen for sufficient amount of time to ensure that the particle is fully loaded with hydrogen. The electrode is then stepped to a potential of −0.5 volts vs. Hg/HgO electrode for the particle to discharge. The current is measured as a function of time during this discharge process which is carried out at a constant temperature. After a sufficient amount of time (400–500 sec.), the log (current) is plotted as a function of time. The slope of this plot provides the hydrogen diffusion coefficient value, $D_h$, for the alloy at the discharge temperature.

In accordance with the present invention, Table 1 below shows the relationship between discharge rate, hydrogen diffusion coefficient and the required maximum particle size of the alloy powder for a range of hydrogen diffusion coefficients typical for hydrogen storage metal alloys. The required maximum particle size is equal to twice the maximum diffusion path distance as calculated above. It has been discovered, as illustrated in the examples contained herein, that disabling voltage polarization during the initial operational discharge of a cell of the present invention can be eliminated if the alloy particles do not exceed the required maximum particle size. The required maximum particle size is therefore the maximum metal alloy particle size required to eliminate disabling voltage polarization during the initial operational discharge of a cell of the present invention.

TABLE 1

Diffusion Coefficient — Particle Size Relationship at Various Discharge Rates at 0° C.

| Hypothetical Hydrogen Diffusion Coefficient | Required Maximum Particle Size ($\mu$m) for Indicated Discharge Rates | | |
|---|---|---|---|
| ($cm^2$/sec) | 1C | 8C | 18C |
| $1 \times 10^{-9}$ | 54 | 19 | 13 |
| $1 \times 10^{-8}$ | 170 | 60 | 40 |
| $1 \times 10^{-7}$ | 536 | 190 | 126 |

From Table 1, it can be noted that as the discharge rate increases at a cell temperature of 0° C. (e.g., from 1 C to 8 C to 18 C), the required maximum particle size for a given hydrogen diffusion coefficient should decrease. Specifically, as the discharge rate increases from 1 C to 8 C (a factor of 8), the required maximum particle size should be reduced by a factor of $(8)^{1/2}=2.83$. As the discharge rate increases from 8 C to 18 C (a factor of 2.25), the required maximum particle size should be reduced by a factor of $(2.25)^{1/2}=1.50$. It can also be noted that for a particular discharge rate, as the hydrogen diffusion coefficient decreases, the required maximum particle size should be reduced. Specifically, for discharge rates of 1 C, 8 C, and 18 C as the hydrogen diffusion coefficient decreases by a power of 10, the required maximum particle size should be reduced by a factor of 3.16.

$D_h$ values for two known $AB_5$ alloys have been measured using the potential step technique at both 25° C. and 0° C. and the results tabulated in Table 2. $MmNi_{3.6}Co_{0.7}Mn_{0.3}Al_{0.4}$ and $LaNi_{0.4}Sn_{0.3}$ are both alloys available from Treibacher Auermet. The required maximum particle sizes for the two alloys at a desired discharge rate were calculated from the $D_h$ data and reported in Table 2.

TABLE 2

MH Alloy — Temperature — Particle Diameter Relationship

| Alloy Composition | Hydrogen Diffusion Coefficient (cm²/sec) at T = | | Required Maximum Particle Size (μm) for Indicated Discharge Rates | | | | | |
|---|---|---|---|---|---|---|---|---|
| | | | 1C | | 8C | | 18C | |
| | 25° C. | 0° C. | 25° C. | 0° C. | 25° C. | 0° C. | 25° C. | 0° C. |
| Misch metal alloy | $6 \times 10^{-9}$ | $2 \times 10^{-9}$ | 132 | 76 | 46 | 27 | 32 | 18 |
| $LaNi_{4.7}Sn_{.3}$ | $4 \times 10^{-8}$ | $2 \times 10^{-8}$ | 340 | 240 | 120 | 85 | 80 | 56 |

Based on these results, it can be concluded that at the 18 C rate at a cell temperature of 0° C., an alloy having a hydrogen diffusion coefficient on the order of $2 \times 10^{-8}$ cm²/sec has a required maximum particle size in the range of less than 56 μm. Under the same conditions, the misch metal alloy, having a hydrogen diffusion coefficient on the order of $2 \times 10^{-9}$ cm²/sec, has a corresponding required maximum particle size of approximately 18 μm.

Another aspect of the present invention relates the required maximum particle size with the particle size distribution of the metal alloy powder. This relationship advantageously minimizes the amount of alloy processing required to avoid disabling voltage polarization during the initial operational discharge of a cell and allows for efficient alloy powder characterization. Existing crushing, grinding, sieving, screening and size classification equipment in use in the metal powder industry is capable of making a wide range of hydrogen storage metal alloy particle size distributions. However, the larger the required maximum particle size for the desired high rate low temperature performance, the better, since small particle size requirements may be difficult to meet. This is due to the fact that smaller particles are often difficult to transport, process and handle and present safety issues due to their increased pyrophoricity. It is also advantageous to minimize the volume of alloy that must conform to the required maximum particle size, so as to avoid unnecessary processing. It has been discovered, as illustrated in the examples contained herein, that disabling voltage polarization during the initial operational discharge of a cell at high discharge rates and low temperatures can be avoided so long as the hydrogen storage metal alloy powder has a particle size volume distribution whose d(50) value does not exceed the required maximum particle size.

Particle size distributions for a metal alloy are referred to in the art in terms of characteristic particle diameters reported as, for example, d(10), d(50) and d(80) values based on a volume distribution. For example, a d(50) value of 27 μm means that 50% of the sample volume is occupied by particles having a characteristic particle diameter of not more than 27 μm. Particle size distributions for purposes of the within invention are determined using a Microtrac X100 equipped to perform a three laser analysis, as is known in the art. Such an analyzer is commercially available from Honeywell. The sample is dispersed in water, a 60 mL/second flow rate is used, and the measurement period is 60 seconds. The analyzer is operated in the reflective mode.

The cells of the subject invention have unique and highly advantageous properties which make these cells particularly well adapted for use in high drain rate applications. Surprisingly, these cells can provide high power output at very low temperatures, even during the initial operational discharge. In a specific embodiment, these cells can be used in power tools, such as drills, or electric vehicles, which are used at temperatures of 0° C. or less. The cells of the subject invention can be characterized by their performance during certain test discharges. The test discharge is initiated after the cell has been fully charged and when the cell temperature is 0° C. at the initiation of the discharge. The cell is then pulsed at 18 C for 2 seconds on and 8 seconds off to simulate actual power tool field use. Alternately, the test discharge is at an 8 C constant discharge rate. The cells of the subject invention maintain a voltage during the test discharge of more than 0.2 volts during the first half of the discharge curve. In a preferred embodiment, the voltage during the test discharge remains above 0.3 volts for this period. In a most preferred embodiment, the voltage during the test discharge remains above 0.4 volts for this period.

Another aspect of the present invention provides novel methods for obtaining the required maximum particle size in the metal alloy of the negative electrode without additional sieving, crushing or grinding of the metal alloy powder prior to incorporation of the powder into the electrode. In accordance with the subject invention, it is possible to activate a cell in an extended activation protocol comprised of initial formation, heat treating, and cycling. As a result of this unique activation process, disabling voltage polarization even during the initial operational discharge at high rates and low temperatures can be avoided.

The activation protocol of the present invention can be varied as described herein to produce the desired results. In a preferred embodiment, the basic steps for activation include (1) formation, (2) heat treating and (3) cycling of the cell (or battery). As described herein, each of these steps may be performed in a number of ways utilizing variable parameters to obtain specific desired results.

The formation step generally involves applying a current to a cell for a predetermined period of time followed by a discharge, typically draining the cell of usable capacity. The heat treating step (also called heat soak) involves subjecting the cell to a predetermined temperature or temperature range over a predetermined time period. Finally, the cycling step involves charging and discharging the cell for a predetermined number of times of which the depth of discharge may be varied as well as the temperature, amperage and time. In a preferred embodiment, the steps are performed in the above-noted order. However, changing the order of heat treating and cycling does not affect the results and, therefore, provides an alternative method of this invention, as well as any other ordering of steps which produce the desired results.

In a preferred embodiment, the formation step involves cycling the cell at least once until it reaches a desired performance level, but not to the point of bulging, leaking or venting. A preferred formation cycle involves charging the cell at about a C/8 to a C/6 charge for approximately 11 to 16 hours followed by a discharge at 2 C to 0.9 volts. More preferably, the charge is at 0.175 C for 11.5 hours at room temperature, followed by a cell discharge at 2 C to 0.9 volts. In an alternate embodiment, the formation cycle is performed at an elevated ambient temperature of 40° C. In another alternate embodiment, formation includes an extended formation charging period such as 120 hours at a C/6 rate. Other variations of this step are illustrated in the examples section to follow.

Figure 8:
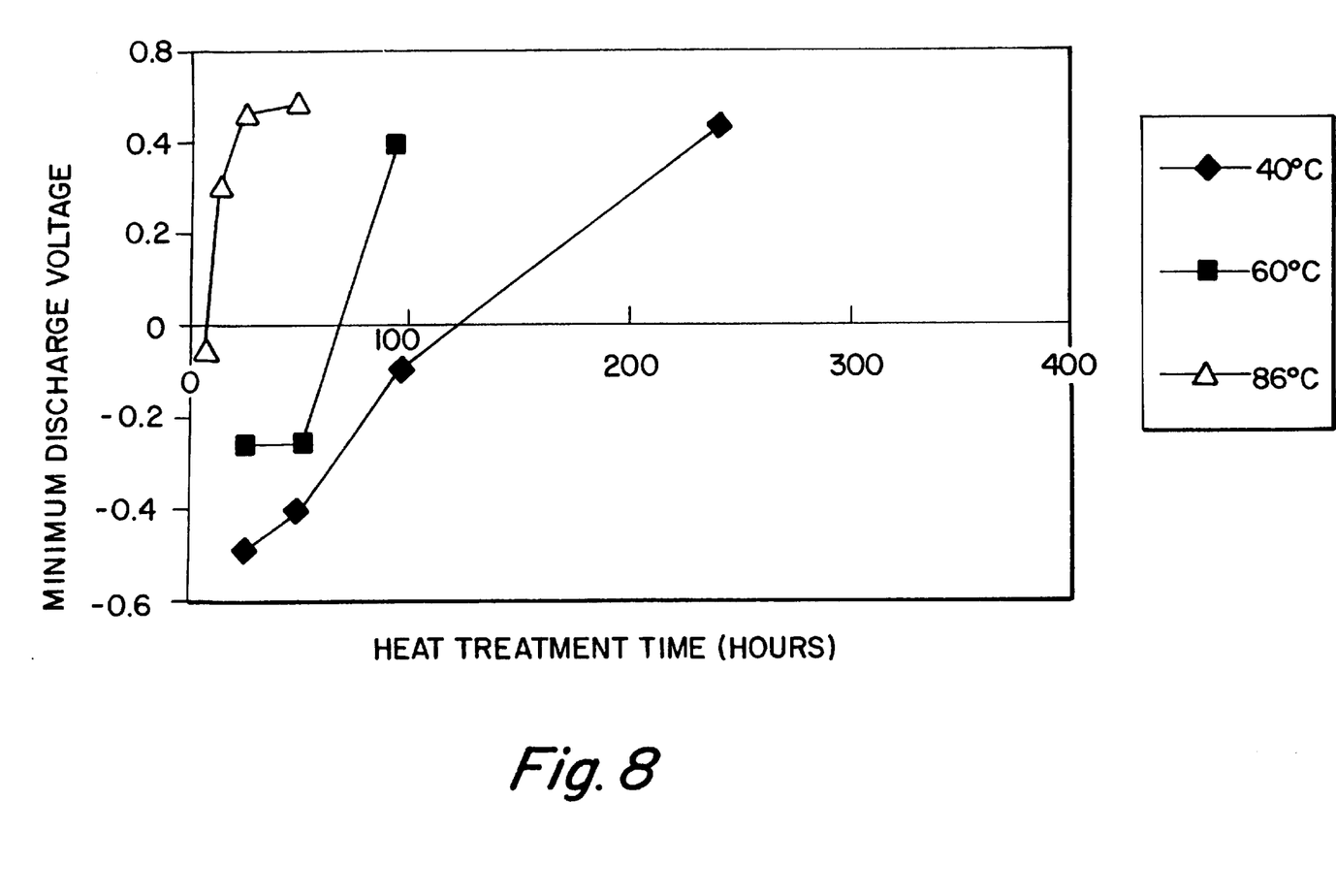
FIG. 8 is a graph of average minimum voltage over time of heat soak for various temperatures.

In a preferred embodiment, the heat treating step comprises exposing the cell to an ambient temperature between about 30° C. and about 120° C., where the maximum temperature may be limited by degradation of cell components. In a more preferred embodiment, the temperature is from about 65° C. to about 105° C. In a preferred embodiment, the heat treating step is at a temperature of approximately 98° C. for a period of approximately 24 hours. In an alternate preferred embodiment, the heat soak is at a temperature of about 90° C. for approximately 22 hours. The duration of the heat treatment can be manipulated as described herein to achieve the desired results. As can be seen from FIG. 8, generally the higher the temperature, the shorter the time period necessary to heat treat the cell to obtain the desired minimum discharge voltage. Likewise, for a given heat treatment temperature, the longer the exposure time period, the higher the minimum discharge voltage. Other variations of this step are illustrated in the examples section to follow.

Since the heat treating step results in a cell having the positive electrode in a highly discharged state, in certain instances, a charge following heat treating is utilized. Such charge can take the form of a "boost" or a complete charge/discharge cycle.

In an alternate embodiment, the formation step and the heat treating step can be combined. Preferably the combined formation and heat treating step comprises charging at C/6 at room temperature for 11.5 hours and storing the cell at 101° C. for 24 hours followed by a discharge at 2 C to 0.9 volts.

In a preferred embodiment, the process of the subject invention comprises a hold period following heat treatment. A hold time of 24 hours or more is preferred. This allows the cells to cool down to a typical room temperature (approximately 22 to 27° C.) prior to initiating the next step in the process, because cells at an elevated temperature (e.g., greater than about 35° C.) do not charge effectively or reliably. A maximum hold time in a preferred process is 72 hours. This maximum ensures that a cell having a highly discharged nickel positive electrode is not stored for long and variable periods of time, since the highly discharged positive electrode is subject to composition changes which may result in permanent degradation in the capacity that the cell is able to provide at usable voltages.

In a preferred embodiment, the cycling step involves either cycling between about 1–10 cycles or "boosting" the cell. For cycling, the maximum number of cycles may be limited due to its potential effect on the total cycle life of the cell. In a most preferred embodiment the number of cycles is 10 cycles. Variations of this step are illustrated in the examples section to follow.

"Boosting" may be utilized in lieu of or in addition to cycling. It is noted that "boosting" may not provide as superior of results as variations on the cycling step, but it can provide excellent results for many high discharge rate applications and, in most cases, consumes less overall time in the processing as well as less equipment time. In the present application, a "boost" is defined as a limited charge input to revive a cell (or battery) in a deeply discharged condition. The boost inputs charge so that functionality of the cells and/or battery can be determined (i.e., the cell and/or battery assumes a positive voltage above a threshold value indicating proper function). The "boost" also allows a charged cell and/or battery to better survive storage over periods of time because the cell or battery can be revived to a higher percentage of its original capacity. Boosting in lieu of cycling is preferably performed after the heat treating step.

The following examples are provided to illustrate the within invention. These examples should not be construed as limiting.

EXAMPLE 1

A nickel metal hydride negative electrode is fabricated by applying a paste consisting of metal hydride-forming alloy particles and a binder onto a perforated nickel plated steel substrate as described herein. The composition of the paste is as follows: binder, 1 wt. percent; carbon, 0.5 wt. percent, alloy, 98.5 wt. percent. The metal alloy used is $MmNi_{3.6}Co_{0.7}Mn_{0.3}Al_{0.4}$ as described above. The hydrogen diffusion coefficient for the alloy is $2\times10^{-9}$ cm$^2$/sec at 0° C. as determined using the potential step technique described herein. The particle size distribution for the alloy powder is determined prior to electrode fabrication using the Microtrac X100 as described above. Three samples of the powder are run, and a mathematical average for the distribution is reported as follows: d(10)=11.4 μm; d(50)=37.32 μm; d(80)=60.5 μm. A conventional sintered nickel electrode as described herein is the companion electrode. Both of these electrodes are wound to form a compact jellyroll with the electrodes of opposite polarity isolated from each other by a porous separator of nylon 6/66. This jellyroll is inserted into a metal can, and the cell is filled with the desired electrolyte solution of potassium hydroxide. The negative electrode is contacted with the nickel plated steel case, and the positive is connected via a nickel tab to the cover. The cover is held within the container by means of a mechanical radial compression seal.

Figure 3:
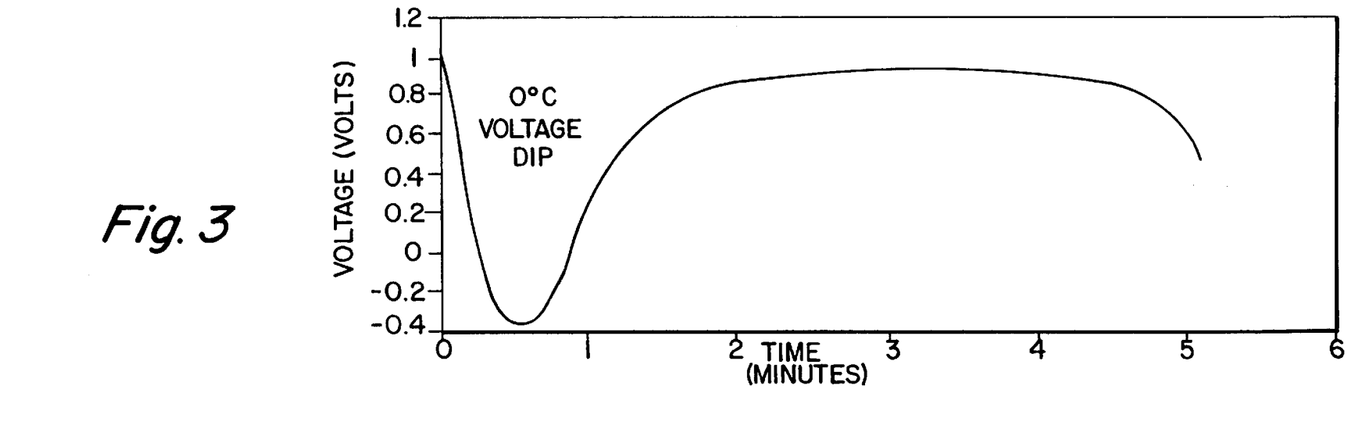
FIG. 3 is a graph of voltage versus time during discharge at 7.5 C and a cell temperature of 0° C. of a known nickel metal hydride cell according to comparative Example 1.

The sub C cell as fabricated is charged at 350 milliamperes for 11.5 hours and subsequently discharged at 4 amperes to 0.9 volts. After this formation cycle, the cell is recharged at 2.4 amperes until fully recharged at 25° C. and stored for three hours at 0° C. The cell has at least 80% of its nominal capacity remaining. The cell is discharged in a test discharge at a high rate of 7.5 C and a cell temperature of 0° C. The cell discharge curve is shown in FIG. 3. The cell of this comparative example displays a significant disabling voltage polarization 6 to 10% into the test discharge. The cell voltage drops to about −0.4 volts and the cell cannot deliver adequate power. The d(50) for the metal alloy in this comparative example exceeds the required maximum particle size of 27 μm for this alloy at this discharge rate, and therefore disabling voltage polarization occurs. FIG. 3 further illustrates that cell voltage recovery occurs after the minimum is reached and is attributed to the temperature increase due to resistive heating during discharge, heating which increases the hydrogen diffusion coefficient for the alloy.

EXAMPLE 2

Figure 4:
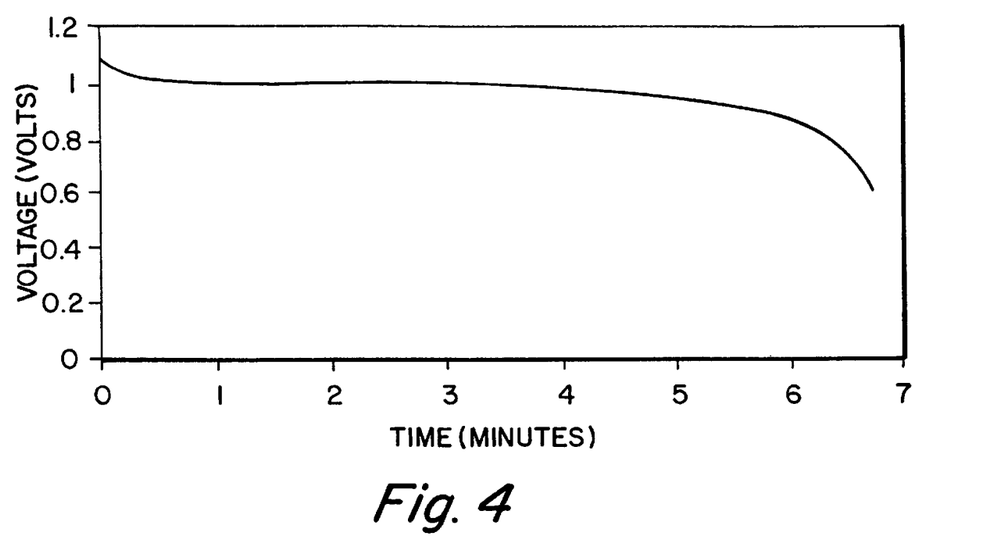
FIG. 4 is a graph of voltage versus time during discharge at 7.5 C and a cell temperature of 0° C. of a nickel metal hydride cell of the present invention according to Example 2.

The cell of this example is assembled as described in Example 1, using the same alloy. The alloy particles in this example are sieved prior to incorporation into the electrode. The particle size distribution for the sieved alloy powder is determined prior to electrode fabrication using the Microtrac X100 as described above. Three samples of the powder are run, and a mathematical average for the distribution is reported as follows: $d(10)=6.2$ $\mu$m; $d(50)=15.5$ $\mu$m; $d(80)=26.6$ $\mu$m. The cell is charged at 350 milliamperes for 11.5 hours and subsequently discharged at 4 amperes to 0.9 volts as in Example 1. After this formation cycle, the cell is fully recharged and stored for three hours at 0° C. as in Example 1. The cell has at least 80% of its nominal capacity remaining. The cell undergoes a test discharge at an 8 C rate and at a cell temperature of 0° C. at the initiation of the test discharge in the manner described in Example 1. A discharge curve for this cell is shown in FIG. 4. The discharge curve shows no disabling voltage polarization and exhibits significant improvement in terms of discharge voltage characteristics over Example 1. In accordance with the present invention, the d(50) for the metal alloy in this example does not exceed the required maximum particle size of 27 $\mu$m for this alloy at this discharge rate, thereby avoiding disabling voltage polarization.

EXAMPLE 3

Figure 5:
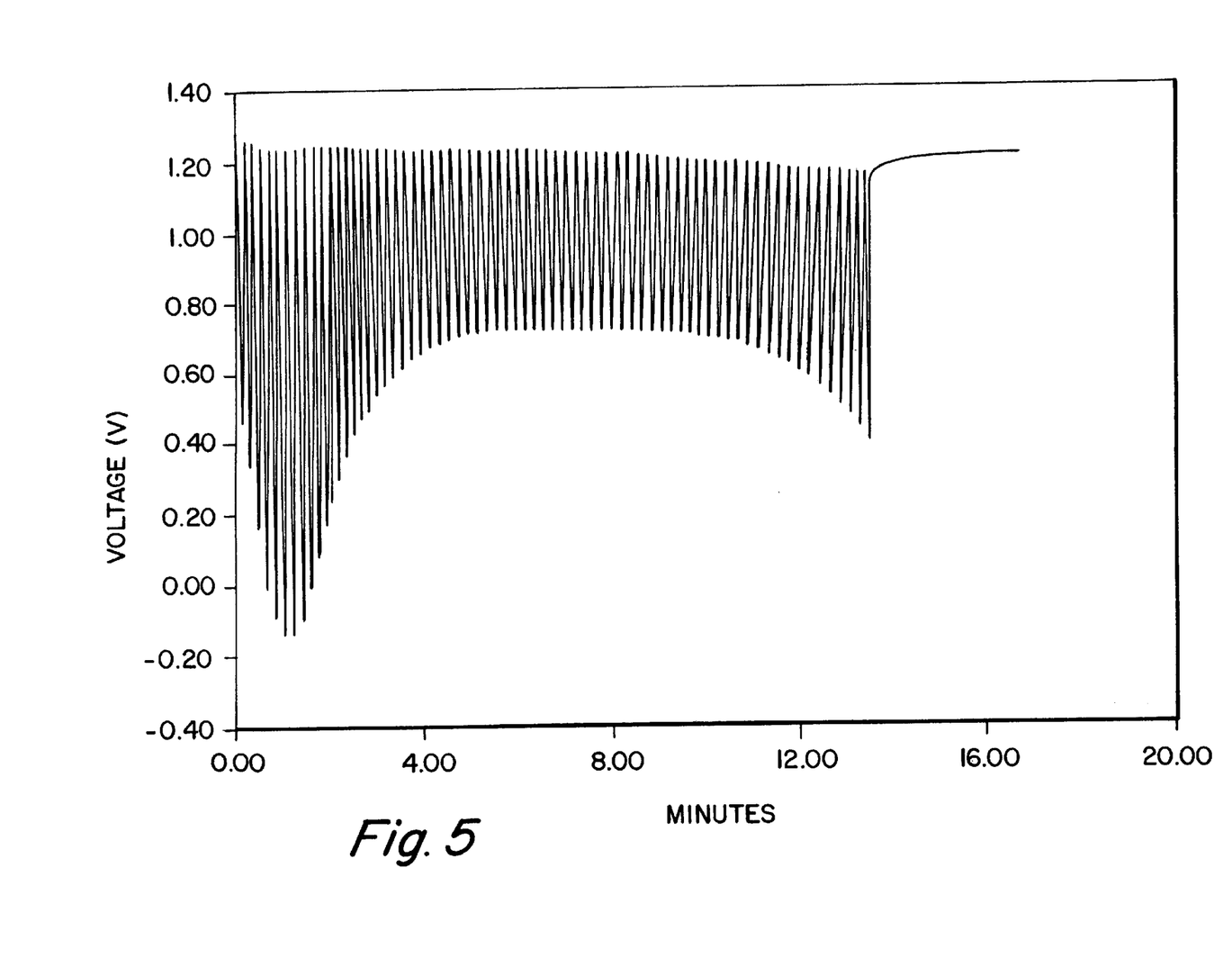
FIG. 5 is a graph of voltage versus time during a pulsed discharge at 18 C and a cell temperature of 0° C. of a known nickel metal hydride cell according to comparative Example 3.

The cell of this example is assembled as described in Example 1, using the same alloy powder with the same particle size distribution as example 1. The sub C cells as fabricated is charged at 350 milliamperes for 11.5 hours and subsequently discharged at 4 amperes to 0.9 volts as in Example 1. After this formation cycle, the cell is fully recharged and stored for three hours at 0° C. as in Example 1. The cell has at least 80% of its nominal capacity remaining. The cell undergoes a test discharge at a pulsed discharge rate of 18 C with 2 seconds on and 8 seconds off. The cell discharge curve for this comparative example is shown in FIG. 5. During the early pulses, the voltage drops to –0.15 volts and cannot deliver power. The d(50) for the metal alloy in this comparative example exceeds the required maximum particle size of 18 $\mu$m for this alloy at this discharge rate, and therefore disabling voltage polarization occurs.

EXAMPLE 4

Figure 6:
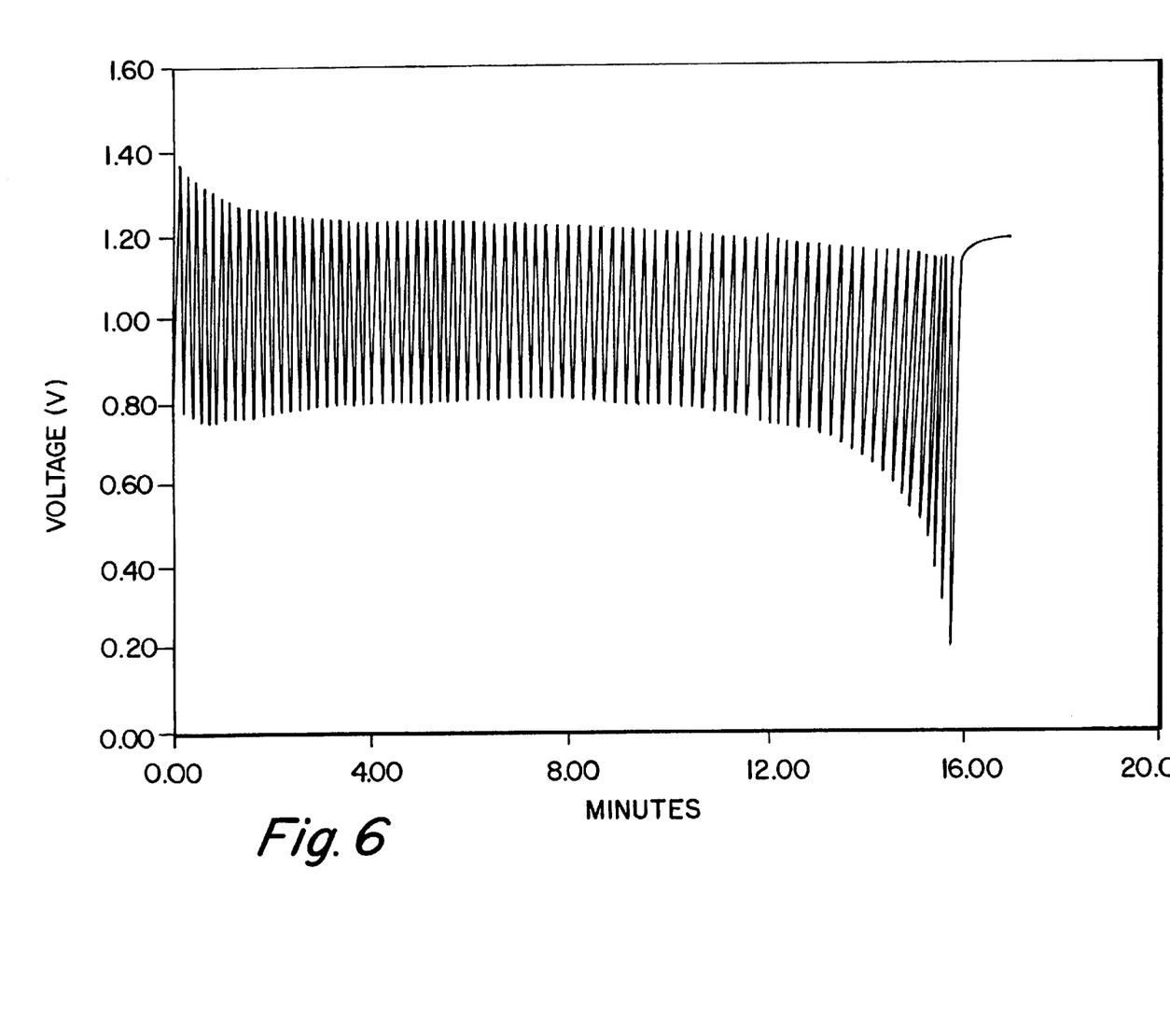
FIG. 6 is a graph of voltage versus time during a pulsed discharge at 18 C and a cell temperature of 0° C. of a nickel metal hydride cell of the present invention according to Example 4.

The cell of this example is assembled as described in Example 1, using the same alloy. The alloy particles in this example are sieved prior to incorporation into the electrode. The particle size distribution for the sieved alloy used in this Example is the same as in Example 2, and is determined prior to electrode assembly using the Microtrac X100 as described above. The cell is charged at 350 milliamperes for 11.5 hours and subsequently discharged at 4 amperes to 0.9 volts as in Example 1. After this formation cycle, the cell is recharged and stored for three hours at 0° C. as in Example 1. The cell has at least 80% of its nominal capacity remaining. The cell undergoes a test discharge at a high pulsed rate of 18 C, with 2 seconds on and 8 seconds off. The cell discharge curve is shown in FIG. 6. The discharge curve shows no disabling voltage polarization and exhibits significant improvement in terms of discharge voltage characteristics over Example 3. In accordance with the present invention, the d(50) for the metal alloy in this example does not exceed 18 $\mu$m, the required maximum particle size for this alloy at this discharge rate, and therefore disabling voltage polarization does not occur.

EXAMPLE 5

Figure 7:
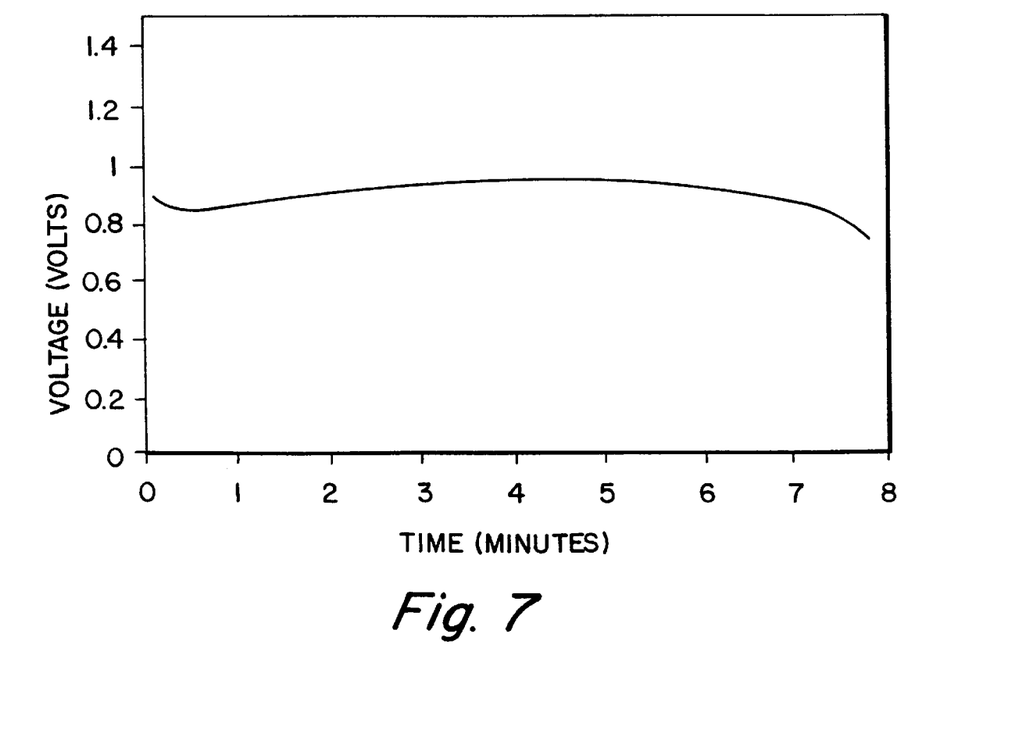
FIG. 7 is a graph of voltage versus time during discharge at 8 C and a cell temperature of 0° C. of a nickel metal hydride cell of the present invention according to Example 5.

A cell using a $LaNi_{4.7}Sn_{0.3}$ hydrogen storage metal alloy in the negative electrode is assembled as described in Example 1. The particle size distribution for the alloy used in this example was determined prior to electrode assembly using the Microtrac X100 as described above. Three samples of the alloy powder are run, and a mathematical average for the distribution is reported as follows: $d(10)=9.6$ $\mu$m; $d(50)=44.3$ $\mu$m; $d(80)=89.7$ $\mu$m. The hydrogen diffusion coefficient of this alloy is determined according to the potential step technique as described herein to be about $2\times10^{-8}$ $cm^2/sec$ at 0° C., about an order of magnitude higher than the alloy used in Example 1. The cell is formed, charged and discharged in a test discharge as in Example 1. A discharge curve for this cell is shown in FIG. 7. The discharge curve shows no disabling voltage polarization at an 8 C discharge rate and a cell temperature of 0° C. and exhibits significant improvement in terms of discharge voltage characteristics over Example 1. In accordance with the present invention, the d(50) for the metal alloy in this comparative example does not exceed 85 $\mu$m, the required maximum particle size for this alloy at this discharge rate, and therefore disabling voltage polarization does not occur.

In examples six through nineteen that follow, sub C size cells are assembled as in Example 1 using the metal alloy of Example 1, and having a nominal capacity of 2 ampere-hours. However, the alloy powder has a d(50) of approximately 39 $\mu$m prior to incorporation into the negative electrode, as determined using the Microtrac X100 as described above. Examples six through nineteen illustrate the process claimed herein for activating a cell fabricated as above, by forming, heat treating and cycling the cell. Examples 8, 10, and 12–19 have preferred results, with example 19 having the most preferred result based on a combination of factors, including overall time. The discharge minimum voltage in Table 3 is a typical minimum voltage of a cell during a test discharge. The test discharge occurs after the indicated activation protocol is completed and after the cell is fully charged at a 1 C rate for one hour at 25° C. and stored for three hours at 0° C. The test discharge is initiated at a cell temperature of 0° C. and is a pulsed discharge at an 18 C rate with two seconds on and eight seconds off.

TABLE 3

| Activation Procedure Example | Formation[a] C/6 Charge Time (hours) | Heat Soak Temperature (° C.) | Heat Soak Time (hours) | Cycles[b] (#) | Discharge Minimum Voltage (Volts) |
|---|---|---|---|---|---|
| 6 | 11.5 | NA | NA | NA | −0.4 |
| 7 | 11.5 | NA | NA | 2 | −0.02 |
| 8 | 11.5 | NA | NA | 10 | 0.74 |
| 9 Ambient T = 40° C. | 11.5 | NA | NA | 1 | 0.35 |
| 10 Ambient T = 40° C. | 11.5 | NA | NA | 4 | 0.63 |
| 11 | 11.5 | 60 | 48 | 2 | 0.15 |
| 12 | 11.5 | 86 | 48 | 2 | 0.65 |
| 13 | 11.5 | 72 | 96 | 8 | 0.74 |
| 14 | 11.5 | 72 | 24 | 2 | 0.57 |
| 15 | 120 | NA | NA | 1 | 0.71 |
| 16 | 48 | 101 | 24 | 6 | 0.78 |

[a]Discharge at 2C to 0.9 volts
[b]Charge at C/2 for 4 hours; Discharge at 2C to 0.9 volts

EXAMPLE 17

1) Formation: Charge at 0.175 C for 11.5 hours
   Discharge at 2 C to 0.9 volts
2) Heat Soak: Heat Treat at 98° C. (+/−3° C.) for 24 hours (+/−2 hours)
3) Hold: 24–72 hours
4) Cycling: 10 cycles

| CYLE NUMBER | CHARGE CURRENT | CHARGE TIME (hours) | DISCHARGE CURRENT | DISCHARGE TIME (minutes) |
|---|---|---|---|---|
| 1 | .5C | 1 | 1.5C | 8 |
| 2 | .5C | 1 | 1.5C | 12 |
| 3 | .5C | 1 | 1.5C | 16 |
| 4 | .5C | 1 | 1.5C | 16 |
| 5 | .5C | 1 | 1.5C | 16 |
| 6 | .5C | 1 | 1.5C | 16 |
| 7 | .5C | 1 | 1.5C | 16 |
| 8 | .5C | 1 | 1.5C | 16 |
| 9 | .5C | 1 | 1.5C | 16 |
| 10 | .5C | 1 | 1.5C | 24 |

The above example 17 results in a discharge minimum voltage of 0.60 volts.

EXAMPLE 18

1) Formation: Charge at 0.175 C for 11.5 hours
   Discharge at 2 C to 0.9 volts
2) Heat Soak: Heat Treat at 96° C. for 24 hours
3) Hold: 24–72 hours
4) Boost: Charge at C/10 for 3 hours The cell is subsequently fully charged by the end user. The above example 18 results in a discharge minimum voltage of 0.50 volts.

EXAMPLE 19

1) Formation: Charge at C/8 for 16 hours
   Discharge at 2 C to 0.9 volts
2) Heat Soak: Heat Treat at 90° C. for 22 hours
3) Hold: 24–72 hours
4) Cycling: 10 cycles

| CYLE NUMBER | CHARGE CURRENT | CHARGE TIME (hours) | DISCHARGE CURRENT | DISCHARGE TIME (minutes) |
|---|---|---|---|---|
| 1 | .5C | 1 | .5C | 24 |
| 2 | .5C | 1 | .5C | 36 |
| 3 | .5C | 1 | .5C | 48 |
| 4 | .5C | 1 | .5C | 48 |
| 5 | .5C | 1 | .5C | 48 |
| 6 | .5C | 1 | .5C | 48 |
| 7 | .5C | 1 | .5C | 48 |
| 8 | .5C | 1 | .5C | 48 |
| 9 | .5C | 1 | .5C | 48 |
| 10 | .5C | 1 | .375C | to 1.0 volts |

The above example 19 results in a discharge minimum voltage of 0.50 volts.

The foregoing description and the illustrative embodiments of the present invention have been described in detail in varying modifications and alternate embodiments. It should be understood, however, that the foregoing description of the invention is exemplary only, and that the scope of the invention is to be limited only to the claims as interpreted in view of the prior art. Moreover, the invention illustratively disclosed herein suitably may be practiced in the absence of any element which is not specifically disclosed herein.

What is claimed is:

1. A metal hydride electrochemical cell comprising a positive electrode, a negative electrode comprising a hydrogen storage metal alloy material, and an electrolyte, wherein said cell discharges in a test discharge at a discharge rate of from about 8 C to about 18 C, wherein said voltage remains above 0.2 volts during the first half of said discharge curve and wherein said discharge is initiated at a cell temperature of 0° C., said metal alloy having a particle size volume distribution whose d(50) value does not exceed a required maximum particle size defined as $2(2D_h t)^{1/2}$ wherein $D_h$ is the hydrogen diffusion coefficient for said alloy at 0° C. and t is the time associated with said discharge rate.

2. The cell of claim 1 wherein said cell is substantially free of cadmium.

3. The cell of claim 1 wherein said discharge rate is 8 C.

4. The cell of claim 1 wherein said discharge rate is 18 C and said discharge is a pulsed discharge of 2 seconds on and 8 seconds off.

5. The cell of claim 1 wherein said positive electrode comprises nickel hydroxide.

6. The cell of claim 1 wherein said positive electrode is a sintered electrode.

7. The cell of claim 1 wherein said hydrogen diffusion coefficient is between 1E-9 to 1E-7 $cm^2$/second.

8. The cell of claim 7 wherein said required maximum particle size is from about 13 μm to about 190 μm.

* * * * *